(12) United States Patent
Labelle

(10) Patent No.: US 7,117,226 B2
(45) Date of Patent: Oct. 3, 2006

(54) METHOD AND DEVICE FOR SEEKING IMAGES BASED ON THE CONTENT TAKING INTO ACCOUNT THE CONTENT OF REGIONS OF INTEREST

(75) Inventor: Lilian Labelle, Dinan (FR)

(73) Assignee: Canon Kabushiki Kaisha, Tokyo (JP)

( * ) Notice: Subject to any disclaimer, the term of this patent is extended or adjusted under 35 U.S.C. 154(b) by 738 days.

(21) Appl. No.: 09/726,023

(22) Filed: Nov. 30, 2000

(65) Prior Publication Data

US 2001/0024517 A1   Sep. 27, 2001

(30) Foreign Application Priority Data

Dec. 3, 1999   (FR) .................................. 99 15280

(51) Int. Cl.
*G06F 17/30* (2006.01)

(52) U.S. Cl. .................... 707/104.1; 707/3; 707/10; 707/101; 707/102; 707/103 R; 382/165; 382/209

(58) Field of Classification Search ................ 382/165, 382/209; 707/3, 6, 5, 10, 101, 102, 103 R, 707/104.1
See application file for complete search history.

(56) References Cited

U.S. PATENT DOCUMENTS 5,579,471 A * 11/1996 Barber et al. ............... 715/700

(Continued)

OTHER PUBLICATIONS

Moghaddam, B., et al., "*Defining Image Content With Multiple Regions-of-interest*," Proceedings IEEE Workshop on Content-Based Access of Image and Video Libraries (CBAIVL '99), Proceedings IEEE Workshop on Content-Based Access of Image and Video, Fort Collins, Co., USA (Jun. 22, 1999), pp. 89-93, XP002153364, ISBN: 0-7695-0034-X.

(Continued)

*Primary Examiner*—Thuy N. Pardo
(74) *Attorney, Agent, or Firm*—Fitzpatrick, Cella, Harper & Scinto

(57) ABSTRACT

A method of seeking images, from an example image, from amongst a plurality of images stored in a database, each of the stored images being associated with an index, representing at least one characteristic of the visual content of the image, includes the following steps: a step of receiving a data item of a second type representing the location of at least one region of interest in the example image; a step of receiving, for each region of interest, a data item of a third type indicating a type of taking into account of the content of the region of interest for the seeking of images; a step of calculating an index of the example image, representing at least one characteristic of the visual content of the example image, the method of calculating this index depending on the data item of the second type and the data items of the third type; a step of calculating a similarity between the example image and each of the images from amongst at least one subset of the stored images, this similarity being calculated from the index associated with the stored image and the index associated with the example image; and a step of supplying at least one image, referred to as the result image, of the database, this result image being selected from amongst the images in the database according to its degree of similarity with the example image.

18 Claims, 9 Drawing Sheets

U.S. PATENT DOCUMENTS

| | | | | |
|---|---|---|---|---|
| 5,652,881 | A * | 7/1997 | Takahashi et al. | 707/104.1 |
| 5,893,095 | A * | 4/1999 | Jain et al. | 707/6 |
| 5,915,038 | A * | 6/1999 | Abdel-Mottaleb et al. | 382/209 |
| 5,983,237 | A * | 11/1999 | Jain et al. | 707/104.1 |
| 6,005,679 | A * | 12/1999 | Haneda | 358/453 |
| 6,043,897 | A * | 3/2000 | Morikawa et al. | 358/1.14 |
| 6,230,154 | B1 * | 5/2001 | Raz et al. | 707/3 |
| 6,263,334 | B1 * | 7/2001 | Fayyad et al. | 707/5 |
| 6,345,274 | B1 * | 2/2002 | Zhu et al. | 707/5 |
| 6,373,979 | B1 * | 4/2002 | Wang | 382/165 |
| 6,584,221 | B1 * | 6/2003 | Moghaddam et al. | 382/165 |

OTHER PUBLICATIONS

White, D. A., et al., "*ImageGREP: Fast Visual Pattern Making In Image Databases*," Proceedings of SPIE, U.S., Bellingham, SPIE, vol. 3022 (Feb. 13, 1997), pp. 96-107, XP000742374, ISBN: 0-8194-2433-1.

Ma, W. Y., et al., "*NeTra: A Toolbox For Navigation Large Image Database*," Proceedings of the International Conference on Image Processing, U.S., Los Alamitos, CA, IEEE (Oct. 26, 1997), pp. 568-571, XP000792837, ISBN: 0-8186-8184-5.

Niblack, W., et al., "The QBIC Project: *Querying Images By Content Using Color, Texture, and Shape*," IBM Computer Sciences Research Report, (Feb. 1, 1993), pp. 1-20 (ABSTRACT—SPIE vol. 1908, pp. 173-187).

* cited by examiner

METHOD AND DEVICE FOR SEEKING IMAGES BASED ON THE CONTENT TAKING INTO ACCOUNT THE CONTENT OF REGIONS OF INTEREST

TECHNICAL FIELD

The present invention concerns a method of seeking images, using an example image, from amongst a plurality of images stored in a database, each of the stored images being associated with a data item representing at least one characteristic of the visual content of the image.

The invention also concerns a device able to implement such a method.

BACKGROUND OF THE INVENTION

A conventional method of seeking digital images in a database containing images is based on a system of indexing the images in the database.

The purpose of the indexing system is to associate, with each image in the database, an item of information characteristic of the content of the image referred to as the index of the image. All these information items form the index of the database.

A user can then interrogate the image database through a request containing an item of information characteristic of the type of image sought. The content of the request is then compared in accordance with a search strategy with the content of the index of the database.

Finally, the image in the database whose indexed information item has the greatest similarity to the content of the request is then extracted. A plurality of images extracted from the database can also be presented to the user, ordered according to their degree of similarity to the request.

In a traditional system of indexing digital images, the index of the database is composed of textual descriptors of the images stored.

The request of the user then consists of key words describing the characteristics of the content of the image to be sought.

This type of indexing by textual descriptors has the drawback of being imprecise, in particular because the same image may be described in different ways by different users.

In order to mitigate this type of drawback, the need has therefore been felt to develop techniques for representing and extracting the semantic content of a digital image.

Methods have appeared in which an image is characterised according to the distribution of the colours or textures making it up.

In other methods, an image is characterised by the shape or contour of an object making it up.

However, all these descriptors, referred to as "primitives", of the image, reflect only physical characteristics of the image, and are therefore of a low semantic level.

In order to increase the semantic character of the indexing of the images, indexing systems which use a combination of low-level primitives are beginning to appear.

One of the most well-known is certainly the QBIC ("query-by-image-content") system developed by IBM.

To obtain more details on this system, reference can be made to the article "*The QBIC Project: Querying Images by Content Using Color, Texture, and Shape*", by Niblack, W et al., which appeared in IBM Computer Sciences Research Report, pp 1–20 (1$^{st}$ Feb. 1993). Reference can also be made to U.S. Pat. No. 5,579,471 of IBM entitled "*Image query system and method*".

The QBIC system makes it possible to find digital fixed (or video) images from a request by means of the example. In the particular case of fixed images, this request is defined either as a complete image or as an object with a rectangular or arbitrary shape, extracted from an image or defined by the user.

The content of the images in the database is characterised by its colour distribution (histogram), texture and shape.

Where the request is defined as a portion, also referred to as a region, of an image, the similarity measurement also takes account of the spatial position of this region.

However, the request relates at best only to a single portion of the example image.

Moreover, the user has no possibility of designating particular areas of the example image whose content he does not wish to find in the type of images which he is seeking.

In addition, the user cannot specify to the search system that he wishes for the search to be made only from the content of particular regions which he has defined in the example image, without taking into consideration the content of the remainder of the image.

These particular areas or regions of the example image are referred to, in the remainder of the description, as "regions of interest".

SUMMARY OF THE INVENTION

The present invention aims to remedy the aforementioned drawbacks of the image search systems of the prior art.

To this end, the present invention concerns a method of seeking images, from an example image, from amongst a plurality of images stored in a database, each of the stored images being associated with a data item of a first type, referred to as the index of the stored image, representing at least one characteristic of the visual content of the image.

In accordance with the invention this image seeking method comprises the following steps:

receiving a data item of a second type representing the location of at least one region of interest in the example image;

for each region of interest, receiving a data item of a third type indicating a type of taking into account of the content of the said region of interest for the seeking of images;

calculating a data item of a fourth type, referred to as the index of the example image, representing at least one characteristic of the visual content of the example image, the method of calculating the data item of the fourth type depending on the data item of the second type and the data items of the third type;

calculating a similarity between the example image and each of the images amongst at least one subset of the stored images, the similarity being calculated from said data item of the first type associated with the stored image and the data item of the fourth type associated with the example image;

supplying at least one image, referred to as the result image, in the database, this result image or images being selected from amongst the stored images in the database according to its or their degree of similarity with the example image.

Thus, on the one hand, by enabling the user to supply an item of information (a data item of the third type) enabling him to specify the way in which he wishes the content of the regions of interest which he has defined in the example image to be taken into account in the seeking of images, the search method of the present invention offers the user great flexibility in defining his request precisely. Moreover, by adapting the calculation of the index of the example image to these data items of the third type, there is obtained a calculation of similarity between the example image and any stored image which is very precise and which faithfully reflects the choices of the user in the definition of his request.

According to a preferred embodiment of the invention, the data item of the third type, denoted $V_r$, associated with a region of interest, denoted $ROI_r$, is a scalar data item which can take all the values lying between a predefined lower value, $V_{min}$, and a predefined higher value, $V_{max}$. Moreover, if this data item of the third type $V_r$ is equal to the predefined lower value $V_{min}$, the content of the images sought must not be similar to the content of the corresponding region of interest $ROI_r$; if this data item of the third type $V_r$ is equal to the predefined higher value $V_{max}$, the content of the images sought must be similar to the content of the corresponding region of interest $ROI_r$; finally, if this data item of the third type $V_r$ lies strictly between the lower predefined value $V_{min}$ and the higher predefined value $V_{max}$, the content of the images sought must be more or less similar to that of the corresponding region of interest $ROI_r$ depending on whether the value of $V_r$ is close to $V_{max}$ or is close to $V_{min}$, the overall content of the example image also having to be taken into consideration.

In this way, the user has a simple and effective means for defining his choice with regard to the search strategy which he wishes to apply according to the regions of interest defined in the example image. Moreover, the choice of the user 50 so expressed is easily applicable through the index of the example image, whose calculation method depends on the data of the third type.

According to one characteristic of the preferred embodiment of the invention, the data item of the first type constituting the index of a stored image under consideration consists of a histogram of colours relating to the overall content of the image.

Thus, by the use of the distribution of colours in the stored image under consideration as an index of this image, the precision of the index is increased compared with the use of another descriptor such as the texture.

According to a particular aspect of the preferred embodiment of the invention, if all the data items of the third type are equal to the lower predefined value $V_{min}$, or if all the data items of the third type are equal to the higher predefined value $V_{max}$; or if each of the data items of the third type is either equal to $V_{min}$ or equal to $V_{max}$, then the step of calculating the index of the example image includes a step of calculating a vector, $(G_R(Q))$, each component of which consists of the histogram of colours representing the visual content of one of the regions of interest, this vector constituting the index of the example image.

Thus, under the conditions mentioned above relating to the data of the third type, an index of the example image is obtained which represents only the content of the regions of interest of the example image, thus applying a strategy in accordance with the choice of the user expressed by the values which he has allocated to the data of the third type.

According to another particular aspect of the preferred embodiment of the invention, if all the data of the third type are strictly between the lower predefined value $V_{min}$ and the higher predefined value $V_{max}$, then the step of calculating the index of the example image includes the following steps:

calculating a matrix (W) with M rows and M columns, where M is an integer number designating the number of colours available, each element of whose diagonal corresponds to one of the M colours available, each of the elements of the diagonal having a value which is calculated as a function of the dominant character of the colour associated with this element in the regions of interest associated with the example image, and of the data item of the third type associated with each of the regions of interest;

calculating the histogram of colours $(H_M(Q))$ representing the overall visual content of the example image (Q);

defining the index of the example image (Q) as being the result (X(Q)) of the product of the matrix (W) and the histogram of colours $(H_M(Q))$ representing the overall visual content of the example image (Q).

Thus, under the conditions mentioned above relating to the data of the third type, there is obtained an index of the example image consisting of a histogram of colours whose colour elements are weighted, through the product of the histogram and the matrix, as a function of the presence in a dominant fashion of this colour element in the regions of interest defined in the example image.

According to yet another particular aspect of the preferred embodiment of the invention, when the data of the third type are not all equal to the lower predefined value $V_{min}$, and are also not all equal to the higher predefined value $V_{max}$, and are also not each equal either to $V_{min}$ or to $V_{max}$, and also not all strictly between $V_{min}$ and $V_{max}$, the index of the example image consists of the result (X(Q)) of the product of the matrix (W) and the histogram of colours $(H_M(Q))$ representing the overall visual content of the example image (Q), and of the vector, $(G_R(Q))$, each component of which consists of the histogram of colours representing the visual content of one of the regions of interest.

Thus, again, under the conditions mentioned above, relating to the data of the third type, there is obtained an index of the example image whose calculation allows the adaptation of the image search strategy to the values of the data of the third type supplied by the user.

In practice, the data item of the second type representing the location of at least one region of interest in the image consists of a set of two-dimensional points indicative of the shape of the region or regions of interest and its or their location in the image plane of the image.

In this way, there is obtained a mode of representing a region of interest which is inexpensive in terms of computer resources used and which is sufficient from the point of view of the use which is made thereof.

Other advantageous characteristics of the image search method according to the present invention are defined in the claims attached to the present description of the invention.

According to a second aspect, the present invention concerns a device for seeking images, from an example image, from amongst a plurality of images stored in a database.

In accordance with the invention this device comprises means adapted to implement an image search method according to the invention, as defined above.

The present invention also concerns a computer, comprising an image search device according to the invention or means adapted to implement the image search method according to the invention.

The invention also relates to a computer program including one or more sequences of instructions able to implement the image search method according to the invention when the program is loaded and executed in a computer.

The invention also relates to an information carrier, such as a diskette or compact disc (CD), characterised in that it contains such a computer program.

The advantages of this device, computer, computer program and information carrier are identical to those of the method as succinctly disclosed above.

Other particularities and advantages of the invention will also emerge from the following description.

BRIEF DESCRIPTION OF THE DRAWINGS

A preferred embodiment of the present invention will now be described with the help of the accompanying drawings, in which.

DETAILED DESCRIPTION OF THE INVENTION

Figure 1:
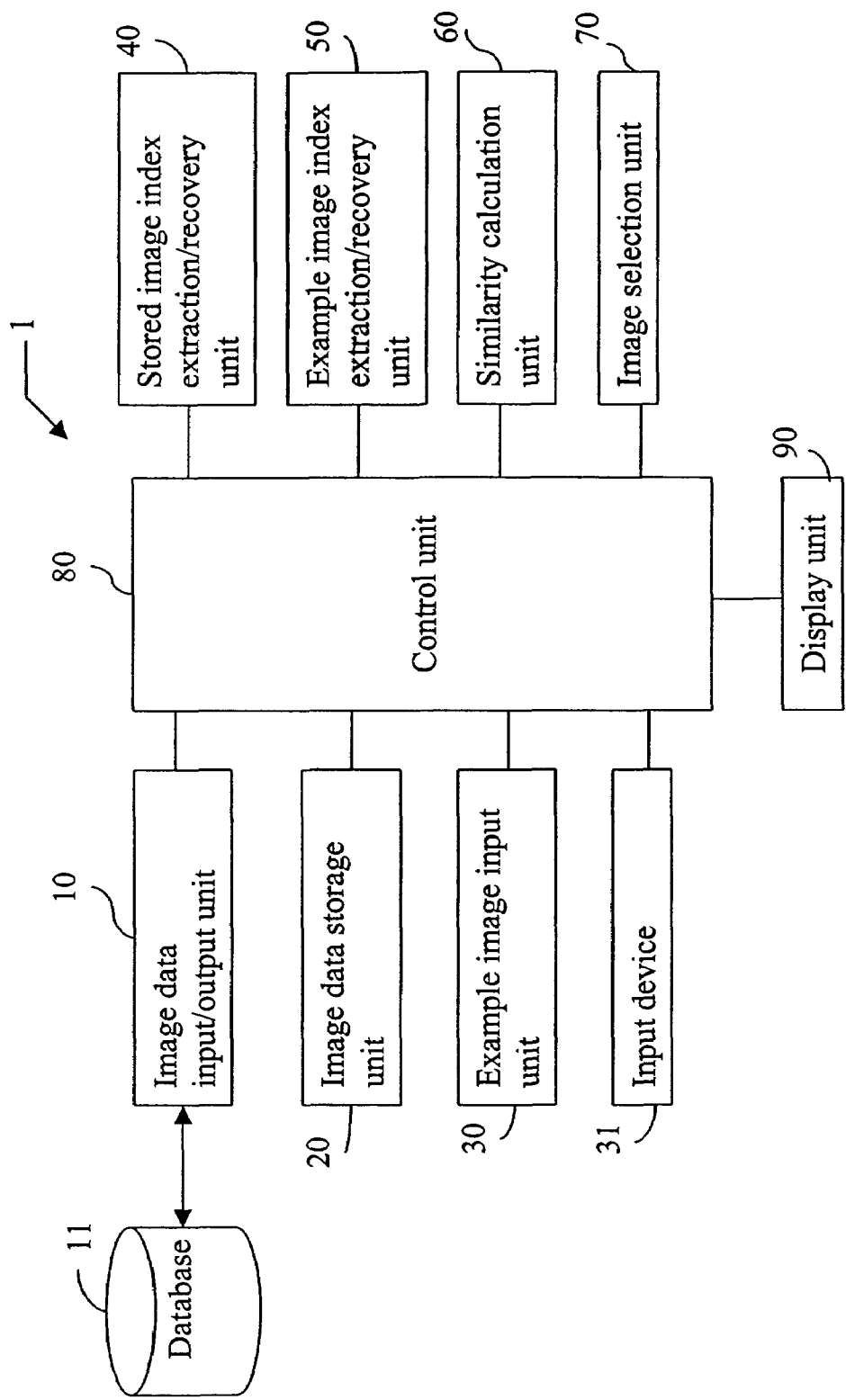
FIG. 1 is a block diagram illustrating the general architecture of an image search device in a database according to the present invention.

A description will first of all be given, with reference to FIG. 1, of a block diagram illustrating the general architecture of an image search device (1) according to the present invention. The device 1 contains hardware elements and software elements.

The device depicted in FIG. 1 comprises an image data input/output unit 10 intended to allow the inputting, into a database 11, of new images to be stored, and to recover a stored image and/or the data indexed at the stored image.

A unit 30 for inputting an example image is associated with an input device 31 to enable a user to input or indicate an example image whose comparison with the stored images in the database will make it possible to obtain one or more images as a result of the search. These images can be displayed on a display unit 90.

The device 1 also comprises an image data storage unit 20, intended to temporarily store the data recovered from the database 11 or the data associated with the example image obtained by the units 30 and 31.

The device of FIG. 1 also comprises a unit 40 for recovering index data associated with the images stored in the database 11, or extracting index data associated with images which are to be stored in the database, depending on circumstances.

In the same way a unit 50 is responsible for extracting or recovering the index data of the example image.

A similarity calculation unit 60 is responsible for evaluating the similarity of the example image with the database images. An image selection unit 70 is then responsible for sorting the database images according to their similarity with the example image, and for selecting one or more images stored as a result of the search. In a preferred embodiment of the invention the selected images are then displayed by the display unit 90.

Finally, the image search device depicted in FIG. 1 has a control unit 80, for controlling the overall functioning of the device.

Each image stored in the database 11 is indexed as follows. When a new image is to be stored in the database, there is previously extracted from it a data item representing at least one characteristic of the visual content of the image. In accordance with one preferred embodiment of the invention, this data item is characteristic of the distribution of the colours (histograms of colours) in the image.

The invention also applies to the case where the images are stored in compressed form. In this case, an image is represented by a bit stream. For example, where the compression algorithm uses digital wavelet transform known from the state of the art, it would be possible to characterise the content of the original image by considering a particular sub-band of the image.

Finally, with each image stored in the database there is associated a data item, referred to in the remainder of the description as "content data item" or "data item of the first type", representing at least one characteristic of the visual content of the image. This data item is referred to as the "index" of the stored image under consideration.

The indexing of an image which is to be stored in the database is effected as mentioned previously, by the stored image index extraction/recovery unit 40.

Figure 2:
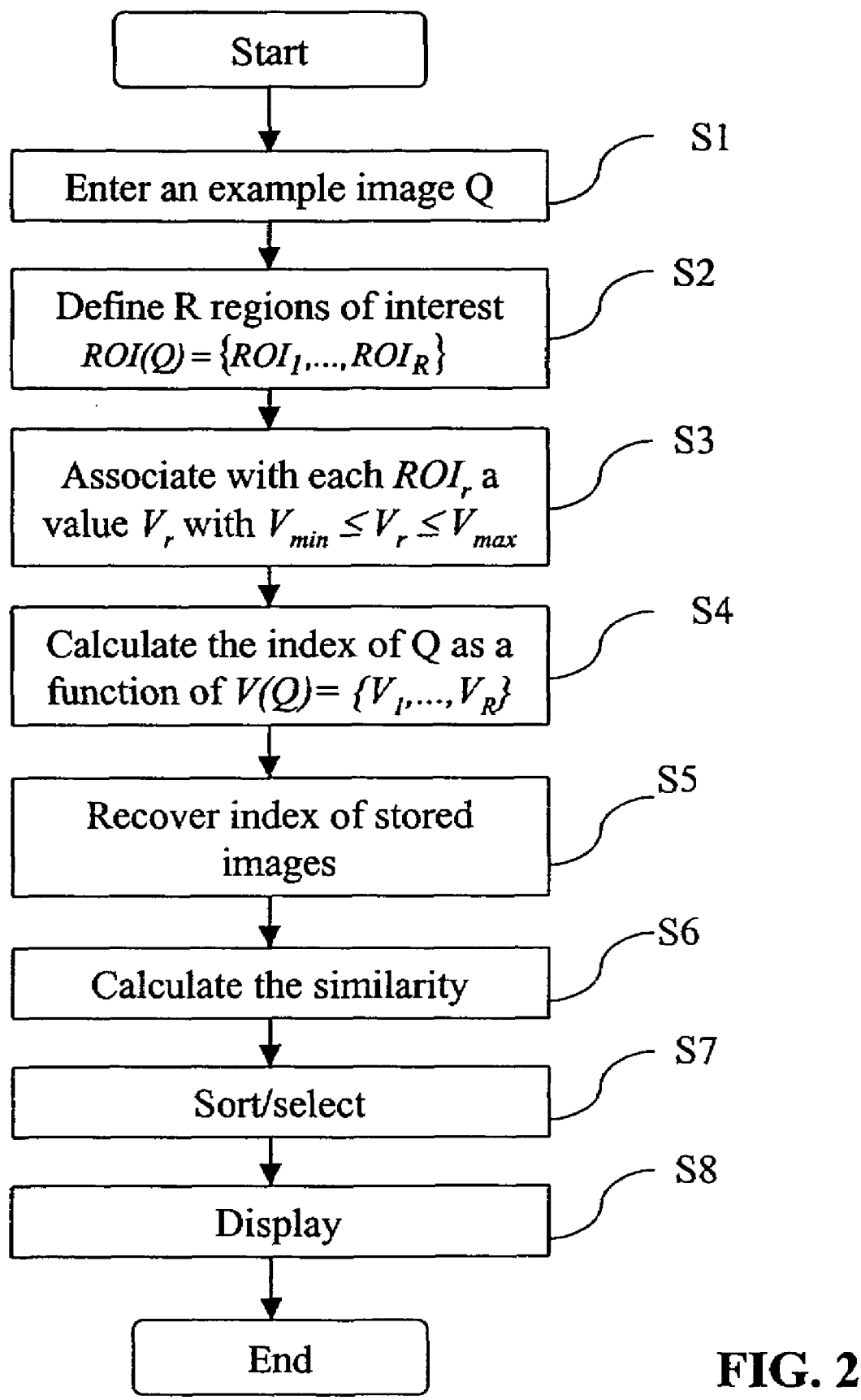
FIG. 2 depicts a flow diagram illustrating the sequence of the steps of an image search method according to the present invention.

With reference now to FIG. 2, a description will be given of the image search method according to the present invention implemented by the image search device (1) depicted in FIG. 1.

The search method commences by step S1 in which a human user uses the example image input unit 30 associated with the input device 31 in order to define an example image which will serve as a reference for seeking images in the database. The user has the choice, for defining the example image, between designating an image in the database, or supplying an image external to the database.

According to the preferred embodiment of the invention, the input device 31 has a pointing device such as a mouse, as well as a keyboard, and the display unit 90 includes a screen.

To enable the user to choose an image in the database as an example image, the search device displays on the screen 90 icons representing the images in the database. The user can then select, by means of the mouse, the icon of the image whose content seems to him to be closest to that of the image or images which he is seeking. As a variant, the user can also use the keyboard for entering the reference of the stored image which he chooses as an example image.

If the user chooses to provide an image external to the database, he can for example supply to the search device 1 the access path to the example image which will be accessible via a disk drive or compact disc (CD ROM) drive integrated into the input device 31.

Returning to FIG. 2, once the user has entered (step S1) an example image in the image search device 1, the latter defines, at step S2, one or more regions of interest (ROIs) associated with the example image.

According to the preferred embodiment of the invention, the example image chosen is displayed on the screen, and the user uses the mouse of the input device 1 for drawing the contour of a region of interest (ROI) of the image, for example using the mouse according to the method known by the expression "drag and drop". The contour drawn may be of a normal geometric shape such as a circle, or a polygon, or any shape. Once the contour of the region of interest has been drawn, the user validates the contour, for example by pressing a key on the keyboard. The contour is then transformed into a set of 2D points which defines the shape and spatial position of this region on the image plane.

The user has the possibility of defining several regions of interest according to the same operation.

As can be seen in box S2 in FIG. 2, this set of data indicating regions of interest associated with the example image Q is denoted ROI(Q).

In accordance with the invention, at the step S3 which follows, the user has the possibility of associating, with each region of interest $ROI_r$ which he has defined, a data item $V_r$ whose value indicates the manner according to which he wishes for the visual content of the region of interest concerned to be taken into account by the image search process.

According to one characteristic of the chosen and illustrated embodiment of the invention, this data item associated with each region of interest is a scalar data item, entered either by means of the keyboard or by means of a pointing device, a mouse for example.

More precisely, in the embodiment of the invention, this scalar data item can take all the values lying between a lower limit (denoted $V_{min}$) and an upper limit (denoted $V_{max}$).

According to one advantageous characteristic of the embodiment of the invention chosen and illustrated, the meaning given to the value of each data item $V_r$ associated with a region of interest $ROI_r$ is as follows.

If $V_r$ is equal to $V_{min}$, this means that the user is seeking images in the database whose visual content is not similar to that of the associated region of interest $ROI_r$.

If $V_r$ is equal to $V_{max}$, this means that the user is seeking images whose visual content is similar to that of the associated region of interest $ROI_r$.

If $V_r$ is strictly between $V_{min}$ and $V_{max}$, this means that the user is seeking images whose visual content is similar to that of the example image taken in its totality, but more particularly taking account of the content of the associated region of interest $ROI_r$. More particularly, the closer $V_r$ is to $V_{max}$ the closer the visual content of the images sought must be to that of the associated region of interest. Conversely, the closer $V_r$ is to $V_{min}$, the less close must be the visual content of the images sought to that of the associated region of interest.

In practical terms, in the preferred embodiment of the invention, the lower limit $V_{min}$ is equal to zero and the upper limit $V_{max}$ is equal to one.

All the data corresponding to the regions of interest defined in the example image Q, that is to say all the 2D points associated with the regions of interest, denoted ROI (Q), and the set, denoted V(Q), of the data $V_r$ associated with the regions of interest, are then stored in the image data storage unit 20.

Returning to FIG. 2, at step S4 the index of the example image Q is calculated.

In accordance with the invention, this index consists of a data item representing at least one characteristic of the visual content of the example image, whose calculation mode takes into account the value of the data $V_r$ associated with the regions of interest.

The method of calculating the index of the example image will be detailed below in relation to FIG. 3.

At the following step S5, the unit 40 for recovering the index of stored images will recover, in the database, the indexes associated with the images amongst at least one subset of the stored images. As explained previously, this index comprises a content data item.

The indexes extracted from the database are then saved in the image data storage unit 20.

In accordance with the embodiment chosen and depicted, the index of any image of the database consists of a histogram of colours relating to the overall content of the image. This histogram is denoted: $H_M(D)$ where D designates any image in the database, and M designates the total number of colours available (palette of colours), each histogram $H_M(D)$ thus containing M elements.

Moreover it should be noted that, in the preferred embodiment of the invention, the colour space used is the RGB space, however, any other space, for example the HSV space, can also be used.

As mentioned above, it may be sufficient to extract from the database the indexes associated with only a part (a subset) of the stored images. In fact, this may be the case when the database is organised hierarchically, so as to group together the images in the database in different classes. Each of the classes is then represented by an index having a different semantic value. Thus, by defining a measurement of similarity associated with each of these indexes, a number of calculations of similarity less than that which would have been obtained if the base had not been organised hierarchically would be effected.

At step S6, the similarity calculation unit 60 recovers the indexes of the stored images and the index of the example image previously stored in the unit 20, and effects a calculation of similarity between the example image and each of the stored images whose index has been extracted from the database.

In accordance with the present invention, the calculation of similarity (effected at step S6) between the example image and a stored image under consideration takes into account, through the index of the example image—the calculation of which taking into account the regions of interest ($ROI_r$) and the associated data ($V_r$)—the choice of the user with regard to the strategy to be applied for seeking images in the database.

The similarity calculation method according to the preferred embodiment of the invention will be detailed below in relation to FIG. 4.

Once the similarity calculation has been made at step S6, a sorting and a selection of the stored images which have been compared with the example image, according to their degree of similarity with the example image, are carried out at step S7.

For example, only the stored images whose degree of similarity calculated is greater than a predefined threshold are kept. Amongst the latter only a predefined number of images (for example ten) are selected, these having the highest degree of similarity. The selected images are then displayed on the screen (step S8) in an order of similarity (increasing or decreasing). The user then makes his choice.

As a variant, all the images which have been compared with the example image are displayed on the screen in an order of similarity.

In another variant, only the image in the database which has the greatest similarity with the example image is displayed.

The steps S7 (sorting/selection) and S8 (display) are implemented by the image selection unit 70, of the image search device 1 depicted in FIG. 1.

The control unit 80 of the device 1 controls the sequencing of the steps of the image search method and manages the interoperability between the different units constituting said device.

With reference now to FIG. 3, a description will be given of the method of indexing the example image used at step S4 of FIG. 2 previously described.

Figure 3A:
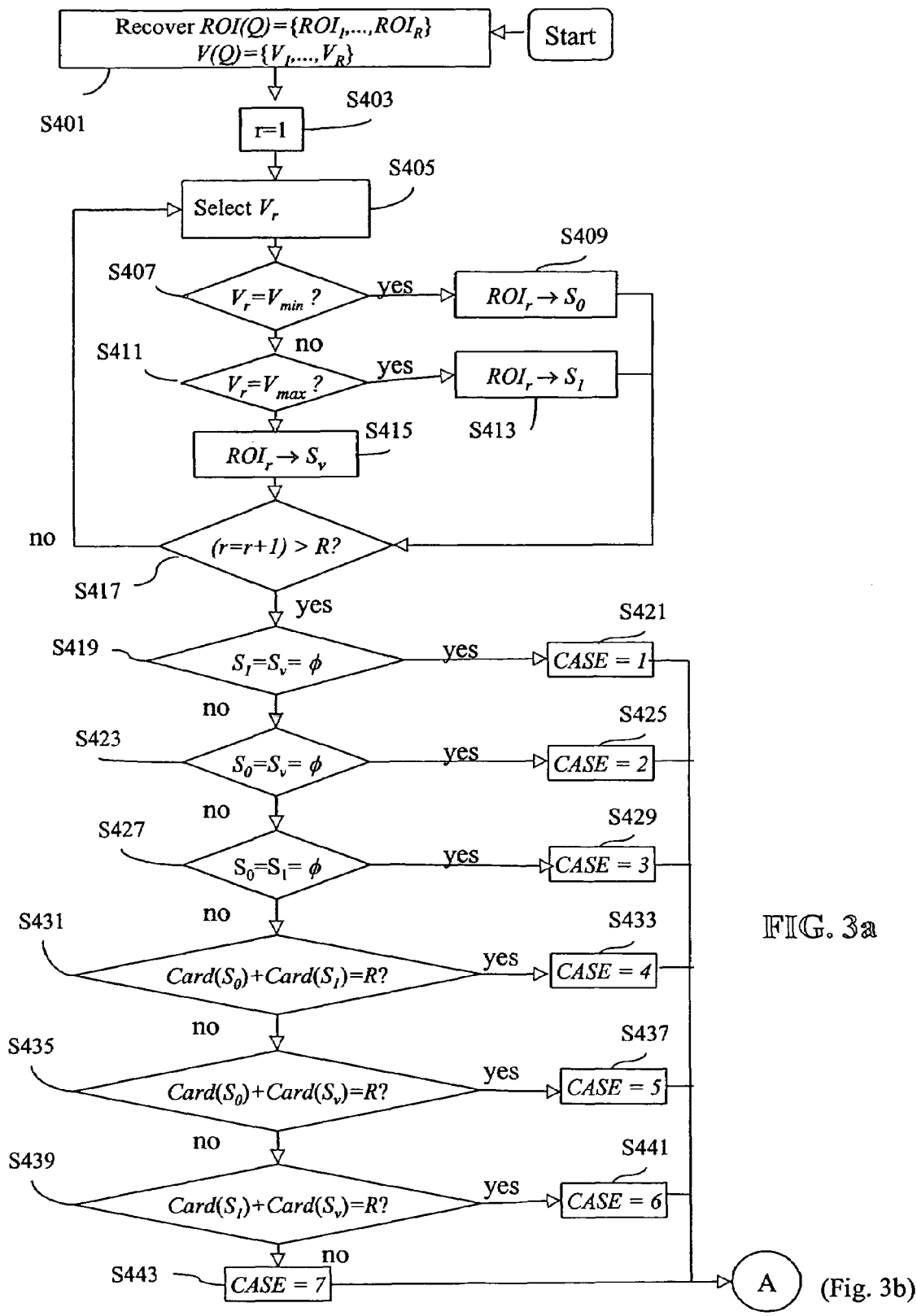
FIG. 3, composed of FIGS. 3a, 3b, 3c, depicts a flow diagram illustrating the method of indexing the example image according to a preferred embodiment of the invention.
Figure 3B:
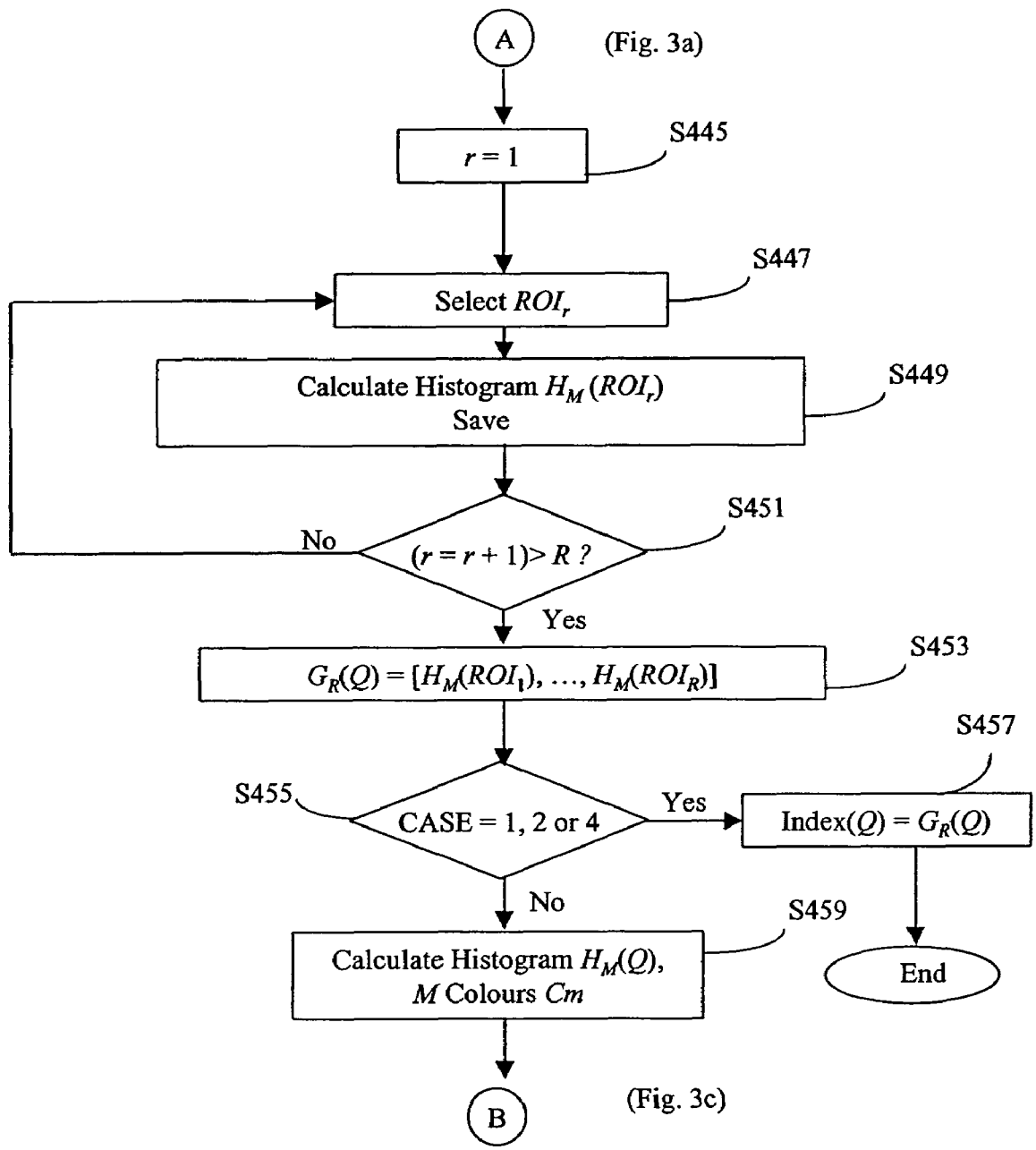
Figure 3C:
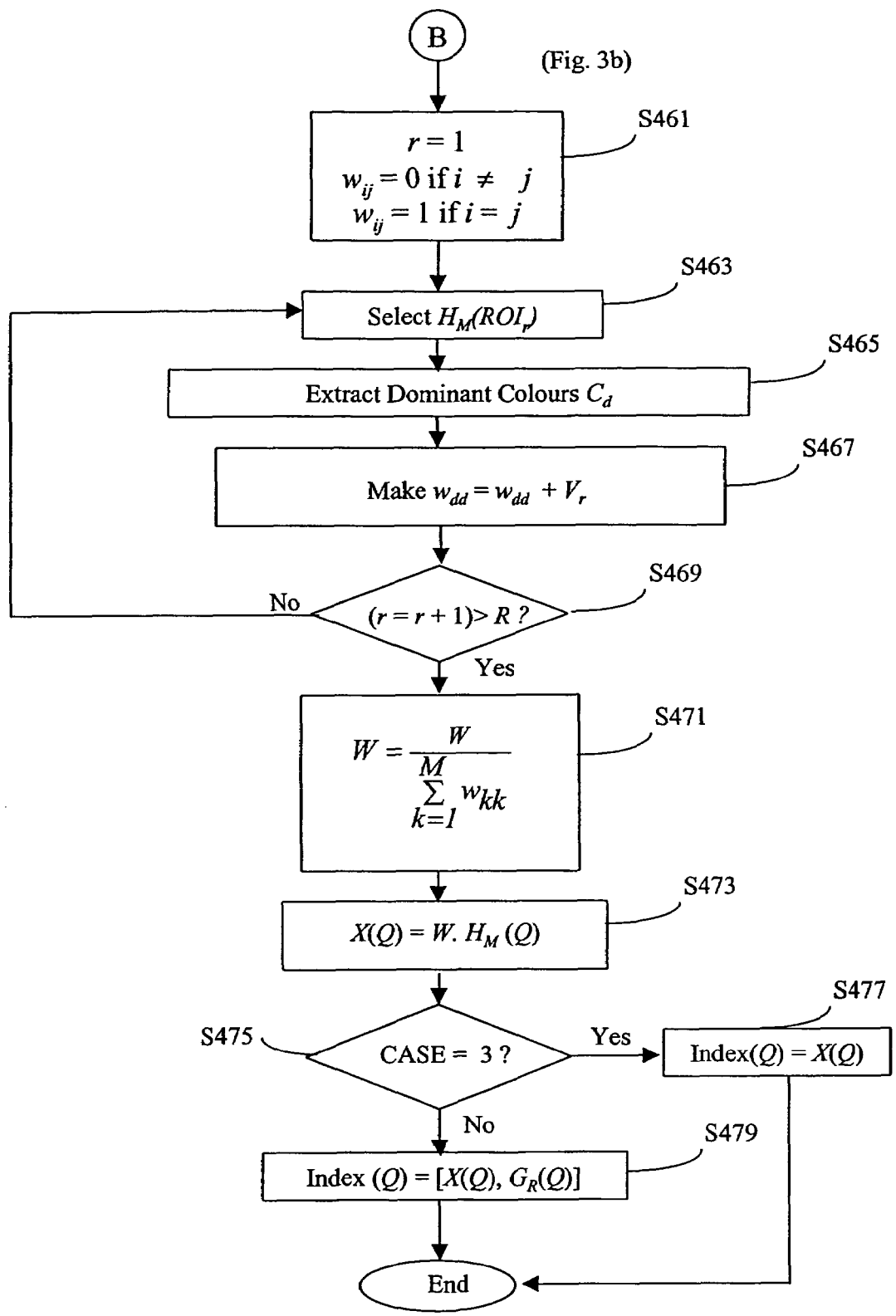

FIG. 3 depicts a flow diagram divided into three parts respectively depicted by FIGS. 3a, 3b, and 3c.

Commencing with FIG. 3a, the method of indexing the example image begins at step S401, in which the data associated with the regions of interest defined in the example image and stored in the storage unit 20 are recovered.

The example image is designated by the letter "Q", these data are designated by ROI(Q) containing the data indicating the shape and location of these regions of interest in the image Q, and by V(Q) containing the scalar data associated with the regions of interest.

As can be seen, the image Q has an integer number R of regions of interest $ROI_1$ to $ROI_R$, and the same number R of associated scalar data $V_1$ to $V_R$.

At the following step, S403, a counter r is initialised to 1, and then at step S405 a data item $V_r$ is selected (commencing with $V_1$ since the counter r was initialised to 1).

At the following step, it is determined whether or not the data item $V_r$ is equal to the predefined lower limit $V_{min}$ which is chosen here equal to zero (0). Moreover the predefined upper limit $V_{max}$ is chosen so as to be equal to one (1).

In the affirmative, an indicator of the region of interest $ROI_r$ associated with the current data item $V_r$ is stored (step S409) in a register S0 representing all the regions of interest whose associated value is equal to $V_{min}$.

In the negative, the following step S411 is passed to, in which it is determined whether or not the data item $V_r$ is equal to the predefined upper limit $V_{max}$. In the affirmative, the identifier of the region of interest associated with the current data item $V_r$ is stored (step S413) in a register S1 representing all the regions of interest whose associated value is equal to $V_{max}$.

In the negative, at step S415 the identifier of the region of interest associated with the current data item $V_r$ is stored in a register Sv representing all the regions of interest whose associated value is strictly between $V_{min}$ and $V_{max}$.

The step S417 which follows is a decision step in which first of all the counter r is incremented and next it is determined whether or not the value of r is strictly greater than the number R of regions of interest defined in the image Q.

In the negative, this means that all the values $V_r$ have not yet been taken into account. In this case, step S405 is returned to in order to select a data item $V_r$ corresponding to the new counter value r, and steps S407 to S417 are recommenced as explained above.

Returning to step S417, if the value of the counter r is tested to be strictly greater than the number R of regions of interest, this means that the last data item $V_r$ selected was $V_R$. Step S419 is then passed to.

At the end of the steps which have just been described, three registers S0, S1, Sv have therefore been obtained, which can be defined as sets whose elements are regions of interest of the example image, for which the data item $V_r$ supplied by the user is respectively equal to $V_{min}$ (set S0), equal to $V_{max}$ (set S1), and strictly between $V_{min}$ and $V_{max}$ (set Sv).

The following steps S419 to S443 will make it possible to determine, from the respective contents of the registers S1, S2, Sv, which case (i.e. condition) applies amongst a plurality of predefined cases.

In accordance with the invention, the method of indexing the example image and therefore the calculation of similarity between a stored image and an example image varies according to the predefined case which applies.

Returning to FIG. 3a, step S419 is a decision step in which it is determined whether the registers S1 and Sv are both empty.

In the affirmative, a variable "CASE" is set to 1, thus indicating that the case which applies is the predefined case number one (hereinafter designated by "CASE 1"). This case corresponds to the situation in which all the data $V_r$ are equal to $V_{min}$.

In the negative, the following step (S423), according to the same principle as at the preceding step, it is tested whether the predefined case number 2 applies (designated hereinafter by "CASE 2"), in which all the data $V_r$ are equal to $V_{max}$. In the affirmative, the variable CASE is set to the value 2 (step S425).

In the negative it is tested successively whether:
case number three applies (S427) (designated hereinafter by "CASE 3"), in which all the data $V_r$ are strictly between zero and one (if S0 and S1 are both empty); if not
case number four applies (S431) (designated hereinafter by "CASE 4") in which the set V(Q) of data $V_r$ comprises solely data which are equal to $V_{min}$, and others which are equal to $V_{max}$. This condition is tested by verifying that the sum of the elements contained in S0 and S1 (cardinal (S0)+cardinal(S1)) is equal to the total number R of data $V_r$ (cardinal of V(Q)); if not
case number five applies (S435) (designated hereinafter by "CASE 5"), in which the set V(Q) of data $V_r$ comprises solely data which are equal to zero, and others which are strictly between zero and one (card(S0)+card(Sv)=R); if not
case number six applies (S439) (designated hereinafter by "CASE 6"), in which the set V(Q) of data $V_r$ comprises solely data which are equal to $V_{max}$, and others which are strictly between $V_{min}$ and $V_{max}$ (card(S1)+card(Sv)=R); if not, by default,
case number seven applies (S443) (designated hereinafter by "CASE 7"), in which the set V(Q) of data $V_r$ comprises data which are equal to $V_{min}$, others which are equal to $V_{max}$, and finally others which are strictly between $V_{min}$ and $V_{max}$.

Finally, when point A in FIG. 3a has been arrived at, the applicable case has been determined, and the variable CASE has been set to the corresponding value (step S421 or S425 or S429 or S433 or S437 or S441 or S443).

The process of indexing the example image then continues to point A in FIG. 3b, by step S445 in which the counter r is reinitialised to 1.

At the following step S447, a region of interest $ROI_r$ is selected, commencing with the first ($ROI_1$). It should be noted that the expression "selecting" a region of interest means here considering, in the image plane of the example image, the location in terms of 2D coordinates of the region under consideration.

At the following step S449, the histogram of colours $H_M(ROI_r)$ associated with the region of interest selected is calculated and stored.

It should be noted once again that M designates the total number of colours available (palette of colours), each histogram $H_M(ROI_r)$ thus includes M elements.

The following step S451 is a decision step in which first of all the counter r is incremented and it is next determined whether or not the value of r is strictly greater than the number R of regions of interest defined in the image Q.

In the negative, this means that not all the regions of interest have been selected yet. In this case, step S447 is returned to in order to select another region of interest corresponding to the new value of the counter r, and steps S449 and S451 are recommenced as explained above.

If the histograms of colours corresponding to all the regions of interest have been calculated and saved, in this case the test of step S449 is positive, and step S453 is passed to, in which all the histograms are grouped together in a vector $G_R(Q)$ comprising R components, each of which being the histogram of colours previously calculated and corresponding to one of the R regions of interest defined in the example image (Q).

At the following step S455, it is determined whether one of cases 1, 2 or 4 applies. For this the variable CASE is tested.

If the value of this variable is 1, 2 or 4, then step S457 is passed to, in which the index of the example image is defined as being the vector $G_R(Q)$ calculated at the previous step S453, and the process of indexing the example image is terminated.

Conversely, if the test step S455 is negative, S459 is passed to, in which the global histogram of colours $H_M(Q)$ of the example image is calculated, this histogram comprising one element for each of the M colours $C_m$ in the palette. Point B in FIG. 3b is then arrived at.

The indexing process continues to point B in FIG. 3c, from which step S461 is passed to, which is an initialisation step. At this step, the counter is reinitialised to 1.

In addition, variables $w_{ij}$ with i, j representing any images between 1 and M (number of colours available) are initialised to 0 if i is different from j, or to 1 if i is equal to j.

As these variables $w_{ij}$ are intended to represent the elements of a matrix W with M rows and M columns, where each element of the diagonal is associated with one of the colours in the palette, the elements of the diagonal of this matrix are initialised to 1, the other elements being initialised to zero. The role of the matrix W will be explained in the remainder of the description.

After this initialisation step, step S463 is passed to, in which a histogram of colours of a region of interest previously calculated and saved (step S449) is selected, commencing with the one corresponding to the region of interest referenced by $ROI_1$.

At the following step S465, the dominant colours $C_d$ of the histogram selected are identified, using a conventional method based on a comparison with respect to a predetermined threshold of the intensity associated with a given colour.

At the following step S467, for each dominant colour $C_d$ of the current region of interest $ROI_r$, extracted at the previous step, there is added to the element $w_{dd}$ of the diagonal of the matrix W corresponding to this dominant colour the value of the data item $V_r$ associated with the current region of interest $ROI_r$ ($w_{dd}=w_{dd}+V_r$).

At the following step S469, it is determined whether all the histograms corresponding to the regions of interest of the example image have been taken into account. If such is not the case, another histogram of colours is selected (S463) and steps S465 to S469 are recommenced.

When steps S463 to S467 have been performed for all the histograms, each element of the diagonal of the matrix W has been increased by the values of the data $V_r$ associated with the regions of interest for which the colour associated with the said element is dominant.

For example, if the colour $C_{12}$ is dominant solely in the region of interest $ROI_1$ and in the region of interest $ROI_3$, at the end of the process the value of the element $w_{1212}$ of the matrix will also be at its initial value (1) increased by the values of the data $V_1$ and $V_3$ associated respectively with the regions of interest $ROI_1$ and $ROI_3$.

Returning to FIG. 3c, at step S471, each element on the diagonal of the matrix is standardised to 1, dividing each of these elements by the sum of the elements of the diagonal.

At the following step S473, a global histogram of colours X(Q) of the example image (Q) is calculated, where each colour element is weighted by the standardised element corresponding to this colour of the matrix W. This is effected by calculating the product of the matrix W and the colour histogram $H_M(Q)$ of the example image, calculated previously at step S459.

The following step S475 is a decision step in which it is determined whether CASE 3 applies. For this the variable CASE is tested.

If the case which applies is indeed CASE 3, step S477 is passed to, in which the index of the example image is defined as being the weighted histogram of colours X(Q) calculated at the previous step S473.

Conversely, if it is not CASE 3 which applies, this means, since cases 1, 2 or 4 also do not apply (step S455), that CASE 5, 6 or 7 applies.

Under these circumstances, at the final step S479, the index of the example image is defined as being composed of two elements, on the one hand the weighted overall histogram of the image, X(Q), and on the other hand the vector $G_R(Q)$ previously calculated (S453).

Thus, see below a summary of the different indexes (Index(Q)) calculated for the example image (Q) according to the predefined case (CASE) which applies:

| | | |
|---|---|---|
| If CASE = 1, 2 or 4 then | Index(Q) = $G_R(Q)$ | |
| | with $G_R(Q) = [H_M(ROI_1), \ldots, H_M(ROI_R)]$ | |
| If CASE = 3 | then | Index(Q) = X(Q) |
| | with X(Q) = $W.H_M(Q)$ | |
| If CASE = 5, 6 or 7 then | Index(Q) = $[X(Q), G_R(Q)]$ | |

The method of calculating the index of the example image depends consequently on the data $V_r$ associated with the regions of interest defined in the example image. The value of said data, through the predefined cases mentioned above, causes an adaptation of the image research strategy to the meaning of these values.

This change in strategy results in a method of calculating the similarity which varies according to the predefined case which applies, as will be explained below.

At the end of the step of indexing the example image S4 (FIG. 2) which has just been detailed with the help of FIG. 3, next comes the step (S6) of calculating the similarity between the example image and the images stored in the database.

Following this similarity calculation, the images in the database are sorted and selected according to the similarity value calculated for each of them (in accordance with step S7, FIG. 2).

The similarity step and the sorting/selection step will now be described in detail in relation to FIG. 4.

Figure 4A:
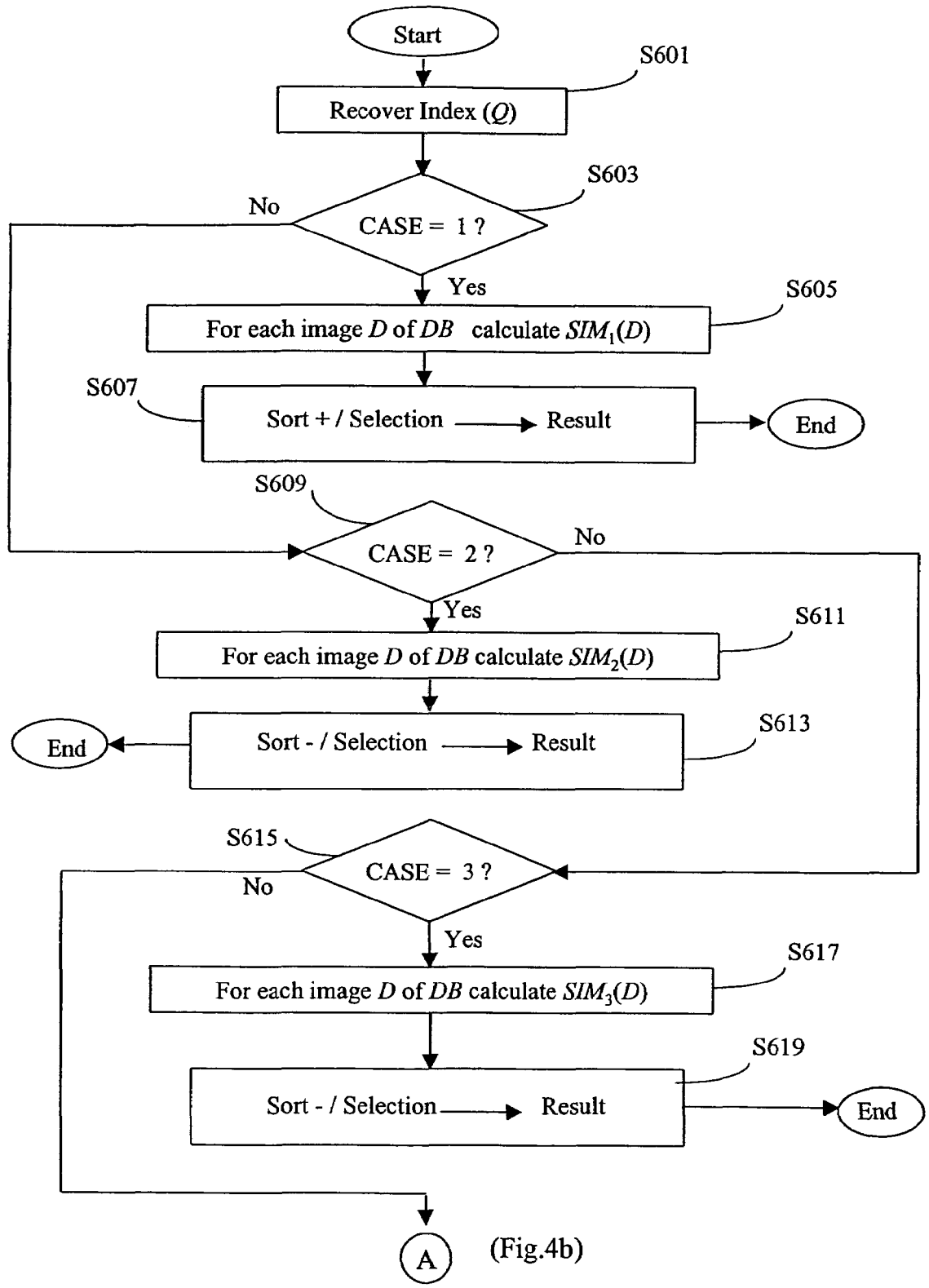
FIG. 4, composed of FIGS. 4a, 4b, 4c, depicts a flow diagram illustrating the method of calculating the similarity between an example image and an image in the database according to a preferred embodiment of the invention.
Figure 4B:
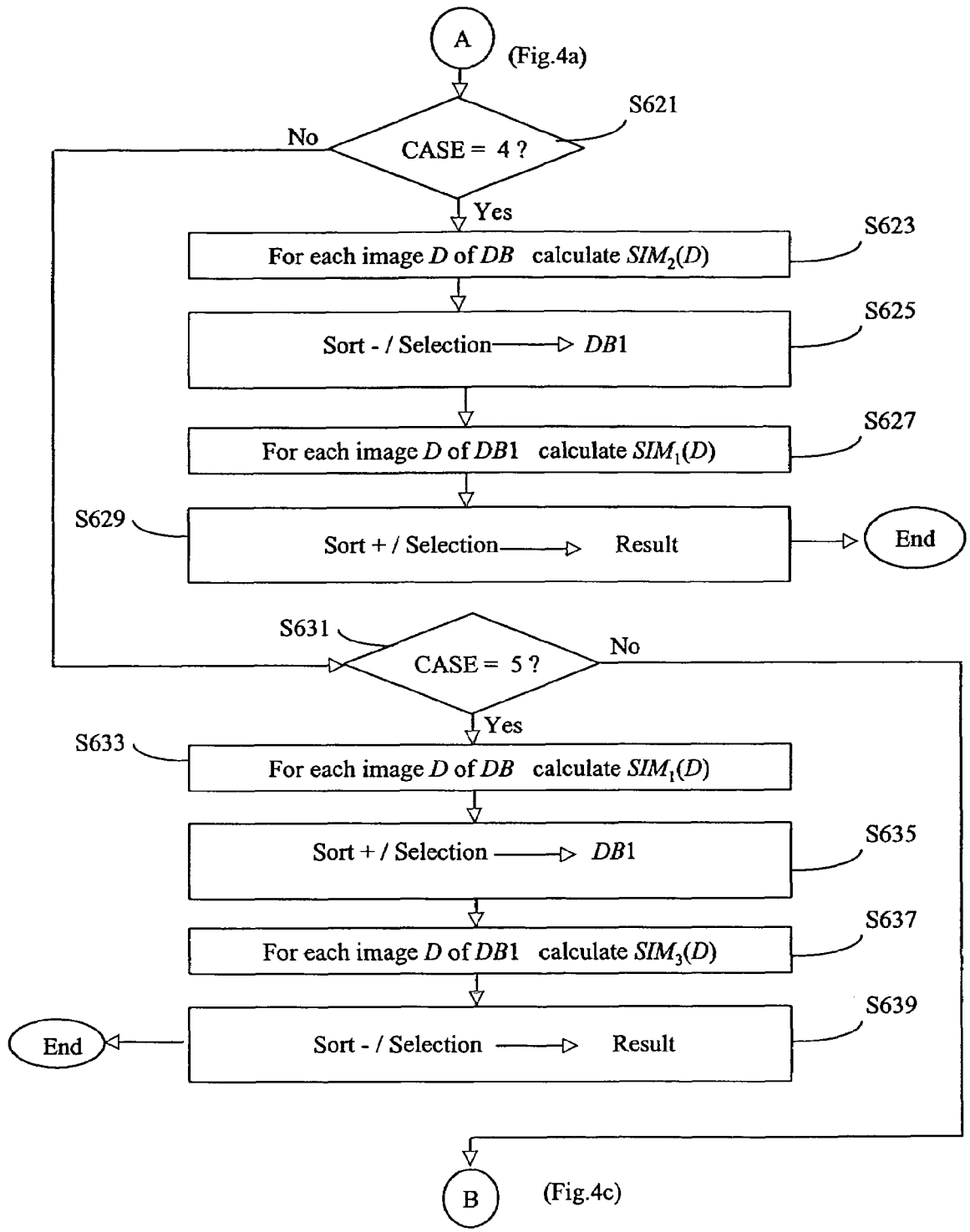
Figure 4C:
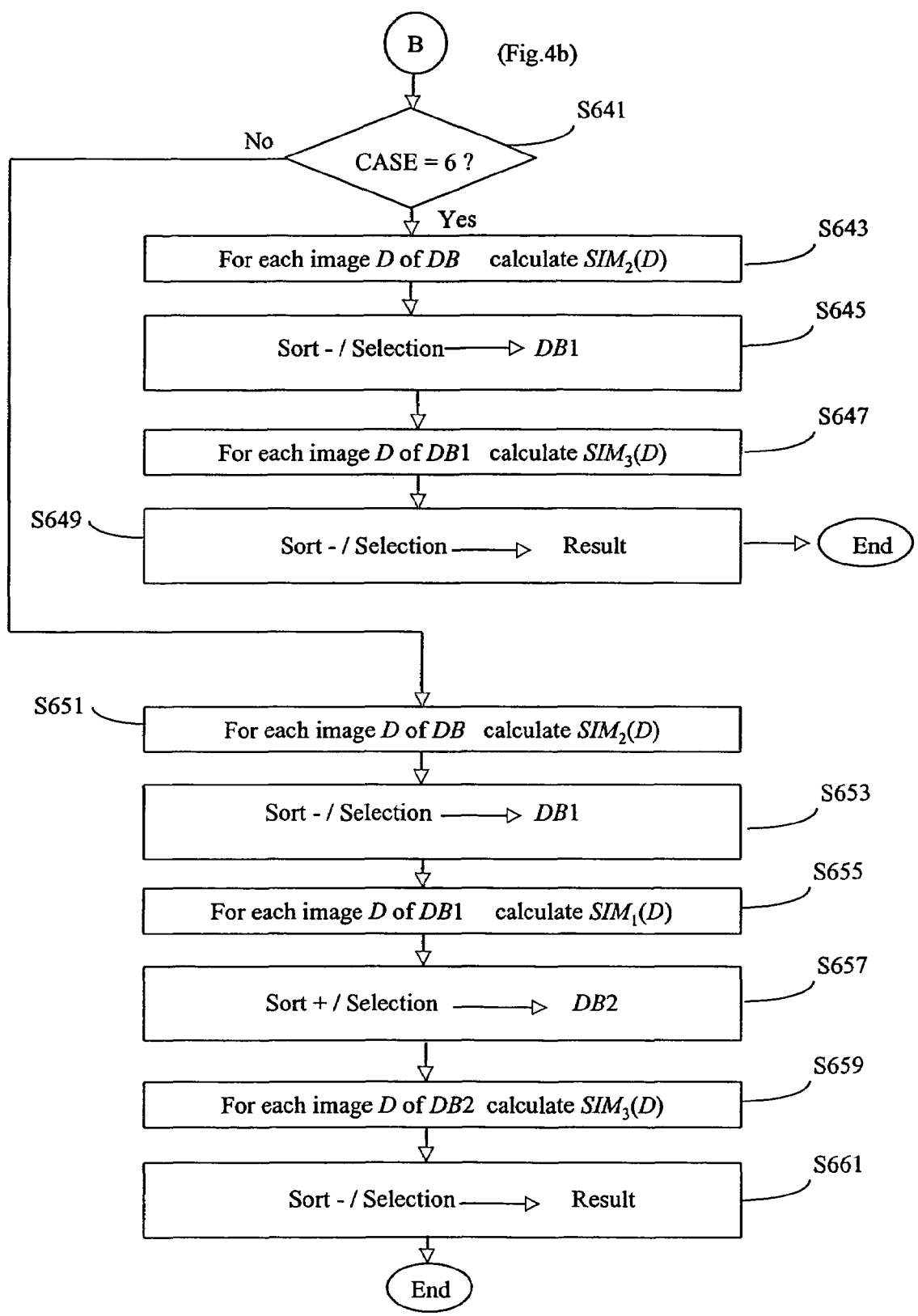

FIG. 4, composed of FIGS. 4a, 4b, 4c, depicts a flow diagram illustrating the method of calculating the similarity between an example image and an image in the database in accordance with the embodiment of the invention chosen and depicted.

It should be stated here that, in accordance with the embodiment chosen and depicted, the index of any image D in the database consists of the histogram of colours relating to the overall content of the image. This index is denoted $H_M(D)$, M designating, as before, the number of colours available.

Commencing with FIG. 4a, the method of calculating the similarity between the example image Q and the images D stored in the database begins with the step S601 in which the index of the example image calculated previously is recovered from the storage unit 20.

Steps S603, S609 and S615 of FIG. 4a, and then steps S621, S631 of FIG. 4b, and finally step S641 of FIG. 4c, are decision steps in which it is successively determined whether respectively the predefined cases 1, 2, 3, 4, 5 or 6 apply.

If at one of these steps, except for step S641, it is determined that the corresponding predefined case does not apply, the following decision step is passed to in order to test whether the following predefined case applies.

When at step S641 it is determined that CASE 6 does not apply, then it is considered that CASE 7 applies since all the cases preceding CASE 6 were tested negatively previously. In this eventuality, steps S551 to S661 are performed in order to apply the appropriate processing to CASE 7, and the similarity calculation process ends there.

Returning to FIG. 4a, if at step S603 it is determined that CASE 1 applies, then successively steps S605 and S607 are performed in order to apply the appropriate processing.

To this end, at step S605 there is calculated, for each stored image D, a similarity measurement designated by $SIM_1$, and obtained by means of the following formula:

$$SIM_1(D) = \text{Max}[H_M(D) \cap H_M(ROI_r^{S0})] \quad (1)$$

in which:

$H_M(D)$ designates the histogram of colours associated with the stored image under consideration (index);

$ROI_r^{S0}$ designates any region of interest in the example image belonging to the previously defined set S0, that is to say a region of interest for which the associated value $V_r$ is equal to $V_{min}$;

$HM(ROI_r^{S0})$ designates the histogram of colours associated with this region of interest (obtained previously at the step S449 of indexing the example image);

the operator $\cap$ designates the operation of intersection between histograms; and the function Max takes the largest value obtained by these intersections.

The operation of intersection between histograms is known from the state of the art. In order to obtain more details on intersection between histograms, reference can be made for example to the article by M. J. Swain and D. H. Ballard, entitled "Color Indexing", International Journal of Computer Vision, 7:1, 1991.

Returning to FIG. 4a, after the similarity calculation $SIM_1$ for each image D in the database (DB) at step S605, step S607 is passed to, in which the images in the database are sorted in increasing order ("Sort +") of the similarity values obtained.

Finally, amongst these ordered images, a predefined number thereof will be selected, for example ten, from amongst those whose similarity value obtained is the lowest. The similarity calculation process is then terminated.

The images finally selected constitute the result of the search and will be presented (displayed) to the user, so that the latter can make his choice.

It should be stated here that CASE 1 which has just been examined corresponds to the situation in which all the data $V_r$ are equal to $V_{min}$, which means that the user is seeking images whose content is not similar to that of the regions of interest defined in the example image.

Thus, in this eventuality, the search method according to the present invention makes it possible to select, in the database, images whose content is the least similar to that of the regions of interest defined in the example image.

At step S609 in FIG. 4a, if it is determined that CASE 2 applies, then steps S611 and S613 are performed successively in order to apply the appropriate processing.

To this end, at step S611 there is calculated for each stored image D a measurement of similarity designated SIM$_2$, and obtained by means of the following formula:

$$SIM_2(D) = \text{Max}[H_M(D) \cap H_M(ROI_r^{S1})] \quad (2)$$

in which:

$H_M(D)$ designates the histogram of colours (the index) associated with the stored image under consideration;

$ROI_r^{S1}$ designates any region of interest in the example image belonging to the previously defined set S1, that is to say a region of interest for which the associated value $V_r$ is $V_{max}$;

$H_M(ROI_r^{S1})$ designates the histogram of colours associated with this region of interest (obtained previously at the step S449 of indexing of the example image);

the operator $\cap$ and the function Max have the same meaning as before (SIM$_1$).

Returning to FIG. 4a, after the similarity calculation SIM$_2$ for each image D of the database (DB) at step S611, step S613 is passed to, in which the images in the database are sorted in decreasing order ("Sort −") of the similarity values obtained.

Finally, amongst these ordered images, a predefined number thereof will be selected, for example ten, from amongst those whose similarity value obtained is the greatest. The similarity calculation process is then terminated.

The images finally selected constitute the result of the search and will be presented (displayed) to the user, so that the latter can make his choice.

It should be stated here that CASE 2 which has just been examined corresponds to the situation in which all the data $V_r$ are equal to $V_{max}$, which means that the user is seeking images whose content is the most similar to that of the regions of interest of the example image.

Thus in this eventuality the search method according to the present invention makes it possible to select from the database images whose content is the most similar to that of the regions of interest defined in the example image.

Likewise, at step S615 in FIG. 4a, if it is determined that CASE 3 applies, then steps S617 and S619 are successively accomplished in order to apply the appropriate processing.

To this end at step S617 there is calculated for each image D stored in the database (DB) a measurement of similarity designated SIM$_3$, and obtained by means of the following formula:

$$SIM_3(D) = H_M(D) \cap X(Q) \quad (3)$$

in which:

$H_M(D)$ designates the histogram of colours (the index) associated with the stored image under consideration;

X(Q) is the weighted histogram of colours associated with the example image and calculated at step S473 in FIG. 3c, during the process of indexing the example image: $X(Q) = W \cdot H_M(Q)$.

Returning to FIG. 4a, after the similarity calculation SIM$_3$ for each image D in the database (DB) at step S617, step S619 is passed to in which the images of the database are sorted in decreasing order ("Sort −") of the similarity values obtained.

Finally, amongst these ordered images, a predefined number thereof will be selected, for example ten, from amongst those whose similarity value obtained is the greatest. The similarity calculation process is then terminated.

The images finally selected constitute the result of the search and will be presented (displayed) to the user, so that the latter can make his choice.

It should be stated here that CASE 3 which has just been examined corresponds to the situation in which all the data $V_r$ are strictly between $V_{min}$ and $V_{max}$, which means that the user is seeking images whose content is more or less similar to that of the regions of interest of the example image, depending on whether the value of $V_r$ is close to $V_{max}$ or $V_{min}$, whilst taking into consideration the global content of the example image.

Thus, in this eventuality, the search method according to the present invention makes it possible to select from the database images whose content satisfies most precisely the search criteria defined for CASE 3, through the use of the weighted histogram X(Q) of the example image.

At step S621 of FIG. 4b now, if it is determined that CASE 4 applies, then steps S623 to S629 are performed successively in order to apply the appropriate processing.

It should be stated here that CASE 4 corresponds to the situation in which there exist data $V_r$ associated with regions of interest (ROIs) of the example image which are equal to $V_{max}$, and others which are equal to $V_{min}$ (but none lying strictly between $V_{min}$ and $V_{max}$).

At step S623 a similarity measurement according to the method of calculating $SIM_2$ (formula 2) is first of all calculated for each image D stored in the database (DB).

Next, at step S625, the images in the database (DB) are sorted in decreasing order ("Sort −") of the similarity values $SIM_2$ obtained.

Then, amongst the set DB of images thus ordered in the database, a subset denoted DB1 will be selected therefrom, for example thirty, from amongst those whose similarity value obtained is the greatest.

At this first stage, there has therefore been selected a subset DB1 of images in the database whose content is most similar to the ROIs of the example image belonging to the set V1 (ROIs whose associated data item $V_r$ is $V_{max}$).

At the following step S627, there is calculated, for each image of the subset of images DB1 selected at the previous step, a similarity measurement according to the method of calculating $SIM_1$ (formula 1).

Next, at step S629, the images of the subset DB1 of the database are sorted in increasing order ("Sort +") of the similarity values $SIM_1$ obtained.

Finally, amongst this subset DB1 of images thus ordered, a predefined number thereof is selected, for example ten, from amongst those whose similarity measurement $SIM_1$ is the lowest. The similarity calculation process is then terminated.

Thus, in CASE 4 which has just been disclosed, the result of the search consists of a certain number of images whose content is both the most similar to the ROIs of the example image belonging to the set V1, and the least similar to the ROIs belonging to V0 (ROIs whose associated data item $V_r$ is $V_{min}$).

These images finally selected are presented (displayed) to the user ordered according to their final degree of similarity, so that he can make his choice.

In a similar fashion, at step S631 in FIG. 4b, if it is determined that CASE 5 applies, then steps S633 to S639 are performed successively in order to apply the appropriate processing.

It should be stated here that CASE 5 corresponds to the situation in which the set of data $V_r$ comprises solely data which are equal to $V_{min}$, and others which are strictly between $V_{min}$ and $V_{max}$.

At step S633 there is calculated first of all for each image D stored in the database (DB) a measurement of similarity according to the method of calculating $SIM_1$ (formula 1).

Next, at step S635, the images in the database (DB) are sorted in increasing order ("Sort +") of the similarity values $SIM_1$ obtained.

Then, amongst the set DB of images thus ordered in the database, a subset denoted DB1 will be selected therefrom, for example thirty, from amongst those whose similarity value obtained is the lowest.

At this first stage, there has therefore been selected a subset DB1 of images in the database whose content is the least similar to the ROIs of the example image belonging to the set V0 (ROIs whose associated data item $V_r$ is $V_{min}$).

At the following step S637, there is calculated for each image of the subset of images DB1 selected at the previous step a similarity measurement according to the method of calculating $SIM_3$ (formula 3).

Next, at step S639, the images of the subset DB1 of the database are sorted in decreasing order ("Sort −") of the similarity values $SIM_3$ obtained.

Finally, from amongst this subset DB1 of the images thus ordered, a predefined number thereof are selected, for example ten, from amongst those whose similarity measurement $SIM_3$ is the greatest. The similarity calculation process is then terminated.

Thus, still in CASE 5 which has just been disclosed, the result of the search consists of a certain number of images whose content is in accordance with the search criteria defined by the user through the values $V_r$ associated with the regions of interest of the example image.

These images finally selected will be presented (displayed) to the user ordered according to their final degree of similarity, so that he can make his choice.

At step S641 in FIG. 4c now, starting from point A issuing from FIG. 4b, if it is determined that CASE 6 applies, then steps S643 to S649 are accomplished successively in order to apply the appropriate processing.

It should be stated here that CASE 6 corresponds to the situation in which the set of data $V_r$ comprises solely data which are equal to $V_{max}$, and others which are strictly between $V_{min}$ and $V_{max}$. CASE 6 is consequently very similar to CASE 5.

At step S643 there is first of all calculated for each image D stored in the database (DB) a measurement of similarity according to the method of calculating $SIM_2$ (formula 2).

Next, at step S645, the images in the database (DB) are sorted in decreasing order ("Sort −") of the similarity values $SIM_2$ obtained.

Then, amongst the set DB of images thus ordered in the database, a subset denoted DB1 will be selected, for example thirty, amongst those whose similarity value obtained is the greatest.

At this first stage, a subset DB1 of images in the database has therefore been selected whose content is most similar to the ROIs of the example image belonging to the set V1 (ROIs whose associated data item $V_r$ is $V_{max}$).

At the following step S647, there is calculated for each image of the subset of images DB1 selected at the previous step a similarity measurement according to the method of calculating $SIM_3$ (formula 3).

Next, at step S649, the images of the subset DB1 of the database are sorted in decreasing order ("Sort −") of the similarity values $SIM_3$ obtained.

Finally, amongst this subset DB1 of the images thus ordered, a predefined number thereof are selected, for example ten, from amongst those whose similarity measurement $SIM_3$ is the greatest. The similarity calculation process is then terminated.

Thus, still in CASE 6 which has just been disclosed, the result of the search consists of a certain number of images whose content is in accordance with the search criteria defined by the user through the values $V_r$ associated with the regions of interest of the example image.

These images finally selected will be presented (displayed) to the user ordered according to their final degree of similarity, so that he can make his choice.

Returning to FIG. 4c, if none of the previous cases (CASE 1 to 6) has been validated, this means that CASE 7 applies, in which the set (V(Q)) of data $V_r$ comprises data which are equal to zero, others which are equal to one and finally others which are strictly between zero and one.

Steps S651 to S661 are then accomplished successively in order to apply the appropriate processing.

At step S651 a similarity measurement according to the method of calculating $SIM_2$ (formula 2) is first of all calculated for each image D stored in the database (DB).

Next, at step S653, the images in the database (DB) are sorted according to the decreasing order ("Sort −") of the similarity values $SIM_2$ obtained.

Then, amongst the set DB of images thus ordered in the database, a subset denoted DB1 will be selected therefrom, for example thirty, from amongst those whose similarity value obtained is the greatest.

At this first stage, there has therefore been selected a subset DB1 of images in the database whose content is the most similar to the ROIs of the example image belonging to the set V1 (ROIs whose associated data item $V_r$ is $V_{max}$).

At the following step S655, there is calculated for each image of the subset of images DB1 selected at the previous step a similarity measurement according to the method of calculating $SIM_1$ (formula 1).

Next, at step S657, the images of the subset DB1 of the database are sorted in increasing order ("Sort +") of the similarity values $SIM_1$ obtained.

Next, amongst the set DB1 of images thus ordered in the database, a subset denoted DB2 will be selected therefrom, for example ten, from amongst those whose similarity value obtained is the lowest.

At this second stage, there has therefore been selected a subset DB2 of images in the database whose content is both the most similar to the ROIs of the example image belonging to the set V1 (ROIs whose associated data item $V_r$ is $V_{max}$) and the least similar to the ROIs of the example image belonging to the set V0 (ROIs whose associated data item $V_r$ is $V_{min}$).

At the following step S659, there is calculated for each image of the subset of images DB2 of the database selected at the previous step a similarity measurement according to the method of calculating $SIM_3$ (formula 3).

Next, at step S661, the images of the subset DB2 of the database are sorted in decreasing order ("Sort −") of the similarity values $SIM_3$ obtained.

Finally, amongst this subset DB2 of the images thus ordered, a predefined number is selected therefrom, for example five, from amongst those whose similarity measurement $SIM_3$ is the greatest. The similarity calculation process is then terminated.

Thus, still in CASE 7 which has just been disclosed, the result of the search consists of a certain number of images whose content is in accordance with the search criteria defined by the user through the values $V_r$ associated with the regions of interest of the example image.

These images finally selected will be presented (displayed) to the user ordered according to the final degree of similarity, so that he can make his choice.

Figure 5:
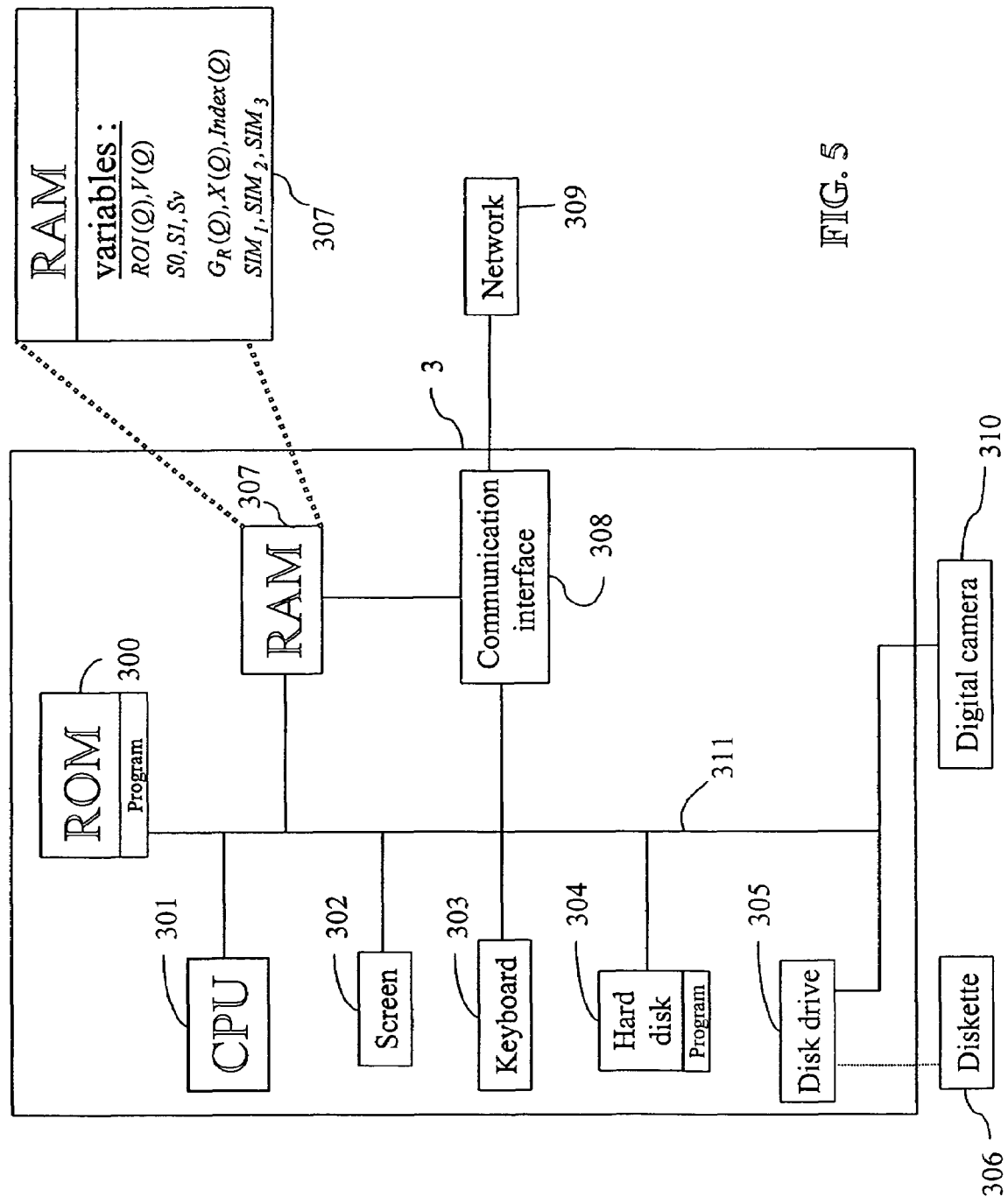
FIG. 5 depicts schematically a computer adapted to implement the image search method according to the present invention.

With reference now to FIG. 5, a description will be given of a computer adapted to implement the image search method according to the present invention and described above in relation to FIGS. 2 to 4. It should be noted that the computer illustrated in FIG. 5 is a particular and preferred embodiment of the general device described above in relation to FIG. 1.

In this embodiment, the image search method according to the invention is implemented in the form of a computer program. This computer program includes one or more instruction sequences whose execution by said computer enables the steps of the image search method according to the invention to be implemented.

In FIG. 6, the computer 3, which can typically be a microcomputer or a workstation, is connected to different peripherals, for example a digital camera 310 or any other image acquisition or storage device, such as a scanner, supplying information (images, video) to be indexed to the computer 3. These images can be stored in the storage means available to the computer, such as a hard disk 304.

The computer 3 also has a communication interface 308 connected to a communication network 309, for example the Internet, able to transmit to the computer digital information to be indexed.

The computer 3 also has data storage means such as a hard disk 304, or a disk drive 305 for writing data to a diskette 306 and reading these data. The computer can also have a compact disc (CD ROM) drive (not shown) on which the images in the database can be stored, as well as a computer card reader (PC card) (not shown).

According to a preferred embodiment of the invention, the executable code of the program for implementing the image search method according to the invention is stored in the hard disk 304.

According to a variant embodiment, the executable code of the program according to the invention is stored in a read only memory 300 (ROM) of the computer.

According to a second variant embodiment, the executable code of the program can be downloaded from the communication network 309 via the communication interface 308 in order to be stored on the hard disk 304.

The computer 3 also has a screen 302 for displaying the images to be indexed or which have been indexed and serving as a graphical interface with the user to enable him notably to define an example image and to define regions of interest, using a pointing device (not shown) such as a mouse or optical pencil, and a keyboard 303.

The computer has a central processing unit (CPU) 301, for example a microprocessor, which controls and directs the execution of the instructions of the program of the invention stored in the read only memory 300 or in the hard disk 304. The central processing unit 301 fulfils the function of the control unit 80 described above in relation to FIG. 1.

The computer also has a random access memory 307 (RAM) containing registers intended to store the variables created and modified during the execution of the program, notably the variables mentioned above in relation to the description of FIG. 5, as can be seen in the enlarged representation of the RAM in FIG. 6.

Finally, the computer has a communication bus 311 affording communication and interoperability between the different aforementioned units making up the computer 3.

Naturally, numerous modifications can be made to the embodiments of the invention described above without departing from the scope of the invention.

The invention claimed is:

1. Method of seeking images, from an example image containing a plurality of regions of interest, from amongst a plurality of images stored in a database, each of the stored images being associated with a data item of a first type, referred to as an index of the stored image, representing at least one characteristic of the visual content of the image, said method comprising the following steps:

for each region of interest, receiving a data item of a second type indicative of a user selection for a type of taking into account of the content of said region of interest for the seeking of images;

calculating a data item of a third type, referred to as the index of the example image, representing at least one characteristic of the visual content of the example image, the structure of said data item of the third type and the method of calculating said data item of the third type depending on said data items of the second type;

selecting an image research strategy according to said data items of the second type;

calculating a similarity, according to the selected image research strategy, between the example image and each of the images amongst at least one subset of the stored images, said similarity being calculated from said data item of the first type associated with the stored image and the data item of the third type associated with the example image; and supplying at least one image, referred to as the result image, in the database, said at least one result image being selected from amongst said stored images in the database according to its degree of similarity with said example image.

2. Image search method according to claim 1, wherein said data item of the second type associated with a region of interest, is a scalar data item which can take all the values lying between a predefined lower value $V_{min}$, and a predefined higher value $V_{max}$, and wherein:

if said data item of the second type is equal to the predefined lower value $V_{min}$, the content of the images sought must not be similar to the content of the corresponding region of interest, if said data item of the second type is equal to the predefined higher value $V_{max}$, the content of the images sought must be similar to the content of the corresponding region of interest, and if said data item of the second type lies strictly between the lower predefined value $V_{min}$ and the higher predefined value $V_{max}$, the content of the images sought must be more or less similar to that of the corresponding region of interest depending on whether the value of said data item of the second type is close to $V_{max}$ or is close to $V_{min}$, the overall content of the example image also having to be taken into consideration.

3. Image search method according to claim 1 or 2, wherein said data item of the first type, called index of the stored image, associated with each of said stored images, consists of a histogram of colours relating to the global content of the image.

4. Image search method according to claim 3, wherein, if all said data items of the second type are equal to said lower predefined value $V_{min}$, or if all said data of the second type are equal to said higher predefined value $V_{max}$, or if each of said data of the second type is equal to $V_{min}$ or equal to $V_{max}$, then said step of calculating a data item of a third type, called index of the example image, includes a step of calculating a vector, each component of which consists of the histogram of colours representing the visual content of one of said regions of interest, said vector constituting the index of said example image.

5. Image search method according to claim 4, wherein if all said data of the second type are strictly between said lower predefined value $V_{min}$ and said higher predefined value $V_{max}$, then said step of calculating a data item of a third type, called index of the example image, includes the following steps:

calculating a matrix with M rows and M columns, where M is a integer number designating the number of colours available, each element of whose diagonal corresponds to one of the M colours available, each of the elements of the diagonal having a value which is calculated as a function of the dominant character of the colour associated with said element in said at least one region of interest associated with said example image, and of said data item of the second type associated with said at least one region of interest;

calculating the histogram of colours representing the overall visual content of said example image; and defining said index of the example image as being the result of the product of said matrix and said histogram of colours representing the overall visual content of said example image.

6. Image search method according to claim 5, wherein, when said data of the second type are not all equal to said lower predefined value $V_{min}$, and are also not all equal to said higher predefined value $V_{max}$, and are also not each equal either to $V_{min}$ or to $V_{max}$, and also not all strictly between $V_{min}$ and $V_{max}$, said index of the example image consists of the result of the product of said matrix and said histogram of colours representing the overall visual content of said example image, and of said vector, each component of which consists of the histogram of colours representing the visual content of one of said regions of interest.

7. Image search method according to claim 6, wherein said step of calculating a similarity between the example image and each of the images amongst at least one subset of the stored images, includes the step of calculating a similarity, denoted $SIM_1$, obtained by means of the following formula:

$$SIM_1(D) = Max[H_M(D) \cap H_M(ROI_r^{S0})]$$

in which $H_M(D)$ designates a histogram of colours calculated for the stored image under consideration; $ROI_r^{S0}$ designates any region of interest in the example image for which the associated data item of the second type is equal to $V_{min}$; $H_M(ROI_R^{S0})$ designates a histogram of colours calculated for this region of interest; the operator $\cap$ designates the intersection operation between histograms; and the function Max takes the largest value obtained by these intersections.

8. Image search method according to claim 6, wherein said step of calculating a similarity between the example image and each of the images amongst at least one subset of the stored images includes the step of calculating a similarity, denoted SIM2, obtained by means of the following formula:

$$SIM_2(D) = Max[H_M(D) \cap H_M(ROI_r^{S1})]$$

in which $H_M(D)$ designates a histogram of colours calculated for the stored image under consideration; $ROI_r^{S1}$ designates any region of interest in the example image for which the associated data item of the second type is equal to $V_{max}$; $H_M(ROI_r^{S1})$ designates a histogram of colours calculated for this region of interest; the operator $\cap$ designates the intersection operation between histograms, and the function Max takes the largest value obtained by these intersections.

9. Image search method according to claim 6, wherein said step of calculating a similarity between the example image and each of the images amongst at least one subset of the stored images includes the step of calculating a similarity, denoted $SIM_3$, obtained by means of the following formula:

$$SIM_3(D) = H_M(D) \cap X(Q) \text{ with } X(Q) = W \cdot H_M(Q)$$

in which $H_M(D)$ designates a histogram of colours calculated for the stored image under consideration; W designates said matrix; $H_M(Q)$ is a histogram of colours representing the global visual content of said example image; and the operator $\cap$ designates the intersection operation between histograms.

10. Image search method according to claim 1, wherein the selected image research strategy uses a measurement of similarity selected from amongst a plurality of possible measurements of similarity based on said at least one data item of the second type.

11. Image search method according to claim 1 or 10, further comprising a step of receiving a data item of a fourth type representing the location of at least one region of interest in the example image.

12. Image search method according to claim 11, wherein said data item of the fourth type representing the location of at least one region of interest in the example image consists of a set of two-dimensional points indicative of the shape of said at least one region of interest and its location in the image plane of said example image.

13. Device seeking images, from an example image, from amongst a plurality of images stored in a database, said device comprising means adapted to implement an image search method according to claim 1 or 2.

14. Device for seeking images, from an example image containing a plurality of regions of interest, from amongst a plurality of images stored in a database, each of the stored images being associated with a data item of a first type, referred to as an index of the stored image, representing at least one characteristic of the visual content of the image, said device comprising:

means for receiving, for each region of interest, a data item of a second type indicative of a user selection for a type of taking into account of the content of said region of interest for the seeking of images;

means for calculating a data item of a third type, referred to as the index of the example image, representing at least one characteristic of the visual content of the example image, the structure of said data item of the third type and the calculation of said data item of the third type depending on said data items of the second type;

means for selecting an image research strategy according to said data items of the second type;

means for calculating a similarity, according to the selected research strategy, between the example image and each of the images amongst at least one subset of the stored images, based on said data item of the first type associated with the stored image and on the data item of the third type associated with the example image; and means for supplying at least one image, referred to as the result image, in the database, based on a selection from amongst said stored images in the database according to a degree of similarity of said result image with said example image.

15. Computer comprising means adapted to implement an image search method according to claim 1 or 2.

16. Computer comprising an image search device according to claim 13 or 14.

17. Image search method according to claim 1, further comprising a step of classifying the plurality of regions of interest into a plurality of sets depending on the data items of the second type respectively associated therewith, wherein the structure of said data item of the third type and the method of calculating said data item of the third type are selected based on the result of the step of classifying.

18. Image search method according to claim 1, further comprising a step of classifying the plurality of regions of interest into a plurality of sets depending on the data items of the second type respectively associated therewith, wherein the selected image research strategy uses a measurement of similarity selected from amongst a plurality of possible measurement of similarities based on the result of the step of classifying.

* * * * *

UNITED STATES PATENT AND TRADEMARK OFFICE
CERTIFICATE OF CORRECTION

PATENT NO.         : 7,117,226 B2                                   Page 1 of 1
APPLICATION NO.    : 09/726023
DATED              : October 3, 2006
INVENTOR(S)        : Lilian Labelle It is certified that error appears in the above-identified patent and that said Letters Patent is hereby corrected as shown below:

On The Title Page, Item (56)
References Cited OTHER PUBLICATIONS (page two)
After "Ma, W. Y., et al.," "*Navigation*" should read -- *Navigating* -- and "*Database*," should read -- *Databases*, --.

COLUMN 1:
Line 63, "W" should read -- W., --.

COLUMN 10:
Line 11, "the" (second occurrence) should read -- in the --.

COLUMN 13:
Line 39, "HM(ROI$_r^{SO}$)" should read -- H$_M$(ROI$_r^{SO}$) --;

COLUMN 20:
Line 19, "a" should read -- an --; and

Line 56, "ROI $^{R^{SO}}$" should read -- ROI $_R^{SO}$ --.

COLUMN 21:
Line 1, "SIM2," should read -- SIM$_2$, --; and

Line 6, "ROI $^{r\,S1}$" should read -- ROI $_r^{S1}$ --.

Signed and Sealed this

Twenty-fifth Day of March, 2008

JON W. DUDAS
*Director of the United States Patent and Trademark Office*